United States Patent
Cundiff

(10) Patent No.: US 6,907,324 B2
(45) Date of Patent: Jun. 14, 2005

(54) INSTRUMENT REFERENCE FLIGHT DISPLAY SYSTEM FOR HORIZON REPRESENTATION OF DIRECTION TO NEXT WAYPOINT

(75) Inventor: Chad L. Cundiff, Overland Park, KS (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/976,614

(22) Filed: Oct. 11, 2001

(65) Prior Publication Data

US 2002/0123830 A1 Sep. 5, 2002

Related U.S. Application Data

(60) Provisional application No. 60/239,721, filed on Oct. 11, 2000.

(51) Int. Cl.[7] .............................. G05D 3/00; G06F 7/00
(52) U.S. Cl. ............................. 701/3; 701/14; 340/973; 340/980; 348/117
(58) Field of Search .......................... 701/300, 7, 9–10, 701/14–18, 3, 4, 120, 122; 340/953, 945–949, 963–980, 961; 348/11–117, 123; 345/7, 9, 419, 156, 23, 618; 244/75 R, 180–183, 1 R, 175, 3.16; 342/121, 176

(56) References Cited

U.S. PATENT DOCUMENTS

| | | | | |
|---|---|---|---|---|
| 4,825,374 A | * | 4/1989 | King et al. ..................... 701/5 |
| 4,860,007 A | * | 8/1989 | Konicke et al. ............ 340/973 |
| 5,072,218 A | | 12/1991 | Spero et al. ................ 340/980 |
| 5,136,301 A | * | 8/1992 | Bechtold et al. ............ 342/176 |
| 5,185,606 A | * | 2/1993 | Verbaarschot et al. ...... 340/961 |
| 5,248,968 A | * | 9/1993 | Kelly et al. ................. 340/961 |
| 5,357,263 A | * | 10/1994 | Fischer et al. ................. 345/9 |
| 5,359,890 A | * | 11/1994 | Fulton et al. ............. 73/178 R |
| 5,382,954 A | * | 1/1995 | Kennedy et al. ............ 340/961 |
| 5,412,382 A | * | 5/1995 | Leard et al. ................ 340/974 |
| 5,445,021 A | * | 8/1995 | Cattoen et al. ........... 73/178 R |
| 5,844,504 A | * | 12/1998 | Etherington ................. 340/973 |
| 5,936,553 A | * | 8/1999 | Kabel .......................... 340/995 |
| 6,154,151 A | * | 11/2000 | McElreath et al. .......... 340/970 |
| 6,163,743 A | * | 12/2000 | Bomans et al. ................. 701/3 |
| 6,240,341 B1 | * | 5/2001 | Snyder .......................... 701/3 |
| 6,314,370 B1 | * | 11/2001 | Curtright ..................... 701/213 |
| 6,389,333 B1 | * | 5/2002 | Hansman et al. ............... 701/3 |
| 6,496,760 B1 | * | 12/2002 | Michaelson et al. ........... 701/3 |
| 6,567,014 B1 | * | 5/2003 | Hansen et al. .............. 340/980 |
| 6,567,069 B1 | * | 5/2003 | Bontrager et al. .......... 345/156 |
| 6,690,299 B1 | * | 2/2004 | Suiter ......................... 340/973 |
| 6,700,482 B2 | * | 3/2004 | Ververs et al. .............. 340/500 |
| 2003/0193411 A1 | * | 10/2003 | Price .......................... 340/973 |

* cited by examiner

*Primary Examiner*—Jacques H. Louis-Jacques
(74) *Attorney, Agent, or Firm*—Honeywell Int'l Inc.

(57) ABSTRACT

The invention provides a primary flight display instrument in which a symbol—such as a small star or triangle—indicates the bearing to the current waypoint in the flight navigation plan. The display may also show a bearing indication symbol showing a follow-on waypoint in the flight plan. These symbols are preferably located on the horizon line of the primary flight display (or the attitude indicator) providing bearing to the current waypoint in the flight plan and/or to the following waypoint. An image processing unit generates the display, including earth ground and horizon, in a view substantially conformal with a VMC view from the aircraft.

20 Claims, 6 Drawing Sheets

INSTRUMENT REFERENCE FLIGHT DISPLAY SYSTEM FOR HORIZON REPRESENTATION OF DIRECTION TO NEXT WAYPOINT

CROSS REFERENCE TO RELATED APPLICATION

This application claims the benefit of provisional application No. 60/239,721, dated Oct. 11, 2000.

BACKGROUND OF THE INVENTION

During visual reference flight (VMC), aircraft pilots often use landmarks (e.g., a mountain peak) on the horizon to help guide them to a destination. Such visual landmarks provide situation awareness. FIG. 1 and FIG. 2 schematically illustrate a pilot 10 viewing a landmark 12 through an aircraft windshield 14 during VMC. As known to those skilled in the art, pilot 10 has a field-of-view 16 defined by windshield 14. Landmark 12 is illustratively shown as a city located at the horizon 18 of ground 20 as viewed from pilot 10. In FIG. 2, earth's ground 20 is shown illustratively as grid lines 22 to provide a perspective view that a distant ground object (e.g., a ground square 24) is smaller than a closer ground object of the same size (e.g., a ground square 26).

When flying under instrument reference flight (IMC), these landmarks are no longer available. Pilots instead typically divide their attention between separate devices that provide the primary flight display or attitude indication and flight navigation data. Pilots do not therefore have clear situational awareness of the direction to the next waypoint on their primary flight display or attitude indicator. Viewing the separate devices also makes safe monitoring of each flight function difficult. Moreover, the information from these devices or displays does not visually simulate the horizon views normally seen by the pilot during VMC, providing further physiological disconnect between instrument and visual reference flight. FIG. 3 shows a representative prior art aircraft instrument panel 30 with multiple displays and devices, including attitude indicators 32 and navigation display 34. As illustrated, devices 32, 34 do not provide information conforming to what pilot 10 sees during VMC of FIG. 1 and FIG. 2; for example, the horizon is shown as a single line 36 on navigation display 34.

SUMMARY OF THE INVENTION

The following patents provide useful background for the invention and are accordingly incorporated herein by reference: U.S. Pat. No. 5,072,218, U.S. Pat. No. 4,439,755 and U.S. Pat. No. 4,368,517.

The invention of one aspect provides a primary flight display instrument in which a symbol—such as a small star or triangle—indicates the bearing to the current waypoint in the flight navigation plan. In another aspect, the invention provides a display with a bearing indication symbol showing a follow-on waypoint in the flight plan. In the preferred aspect of the invention, one symbol is located on the horizon line of the primary flight display (or the attitude indicator) providing bearing to the current waypoint in the flight plan and/or to the following waypoint. One advantage of the invention is that the pilot may navigate with the symbol to get to the current or following waypoint. Placing the symbol on the horizon line provides the pilot with a waypoint indication that replicates waypoint visualization under VMC, and simplifies cockpit scan management.

In still another aspect of the invention, a lateral current waypoint cue is provided with the display to replicate an element common to visual flight. Like above, this aspect increases situational awareness and contributes to visual momentum within the cockpit.

In yet another aspect, the invention provides display elements simulating VMC distances and waypoints. Preferably, the simulation generates a perspective view of ground, and landmarks on that ground, so as to make similarly sized objects appear smaller on the horizon as compared to objects nearer to the aircraft. The simulated objects preferably include landmarks such as airstrips, key mountains and/or cities.

In one preferred aspect, the invention provides a method for enhancing IMC flight aboard an aircraft, including the steps of: collecting at least one of navigation and attitude data from the aircraft; generating an IMC display as a function of the data to show a perspective view of earth ground and horizon that are substantially conformal with a VMC view from the aircraft; and generating at least one of a current or next waypoint symbol on the display.

In another aspect, the step of generating at least one of a current or next waypoint includes the step of generating a first symbol (e.g., an inverted triangle) at the horizon, typically towards the center of the display, to indicate the current waypoint.

The step of generating at least one of a current or next waypoint may also include the step of generating a second symbol (e.g., another inverted triangle) at the horizon to indicate the next current waypoint.

In yet another aspect, the method may include selecting a desired current waypoint, and altering the perspective view to match the selected waypoint. The step of selecting may for example be accomplished by electronically moving the symbol on the display; alternatively, navigation settings aboard the aircraft may be altered to select the current waypoint.

In still another aspect, one or more situation awareness symbols are generated on the display. Illustrative situation awareness symbols may include: a symbol reflecting aircraft speed; a symbol reflecting aircraft altitude; an attitude symbol reflecting aircraft pitch; a compass symbol reflecting heading; and one or more landmarks. Preferably, symbols like landmarks are conformal with the ground perspective view, to enhance situation awareness.

The invention also provides display system for IMC. An information collation unit acquires data from navigation instruments and from attitude and air data instruments of an aircraft. An image processing unit generates an IMC display as a function of the data to show a perspective view of earth ground and horizon that are substantially conformal with a VMC view from the aircraft. The image processing unit also generates one or both of a current or next waypoint symbol on the display, also as a function of the data. Preferably, the current waypoint is showed centrally located on the display and near-to or partially overlaying a center portion of the horizon indication. Preferably, the next waypoint is located on the display and located left or right of the center area, so as to indicate a change of heading required to navigate to the next waypoint. Alternative waypoint symbol locations may be used within the scope of the invention.

In one aspect, the information collation unit acquires aircraft speed and altitude from the air data and attitude instruments of the aircraft. In a related aspect, the information collation unit acquires information including direction to next waypoint and last waypoint direction from the navigation instruments of the aircraft.

These and other aspects and advantages of the invention are evident in the description that follows and in the accompanying drawings.

DESCRIPTION OF PREFERRED EMBODIMENTS

Figure 4:
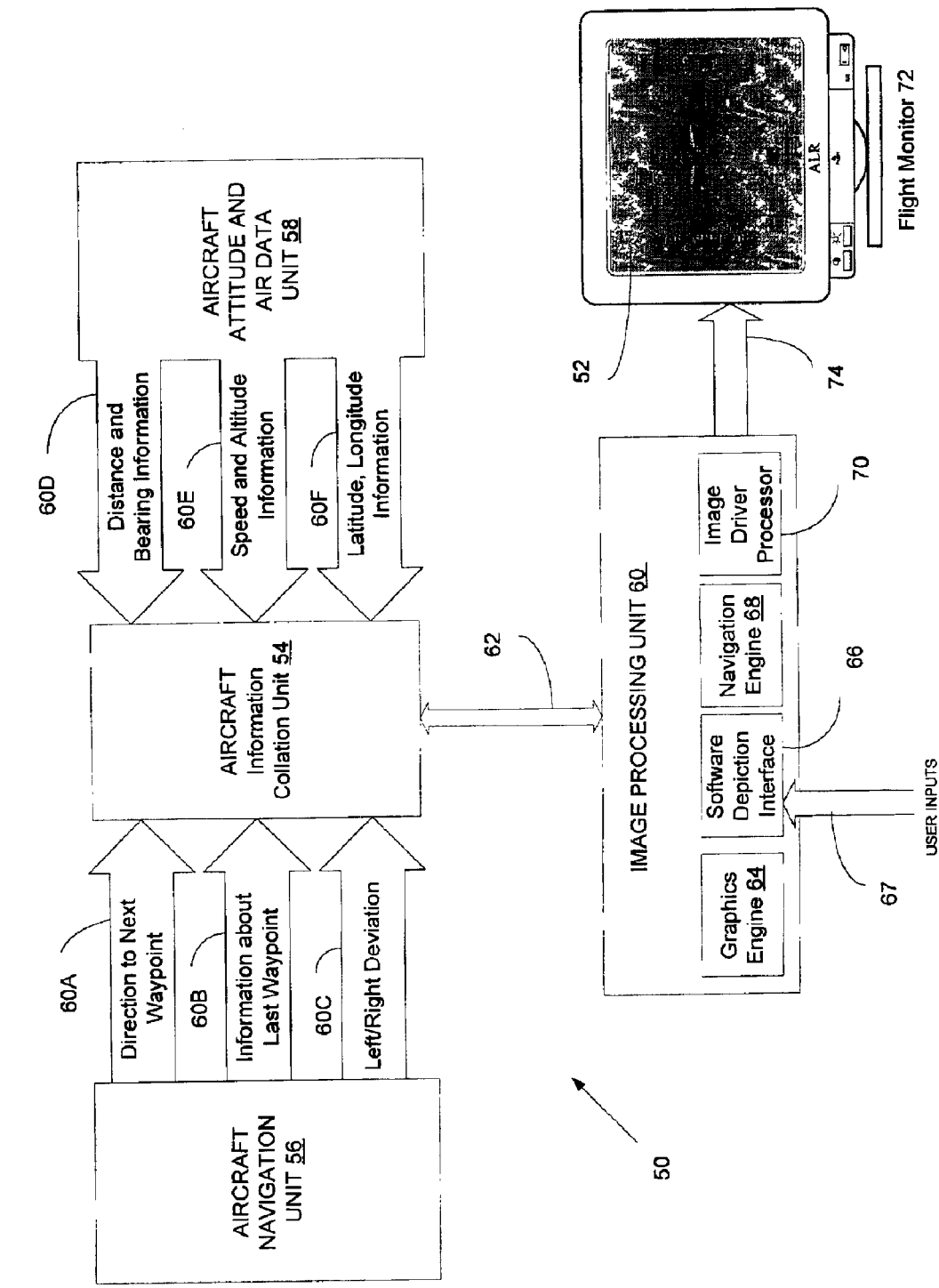
FIG. 4 shows a system for generating a display suitable for IMC in accord with the teachings of the invention.

FIG. 4 shows a system 50 constructed according to the invention; system 50 may reside within an aircraft to generate a flight display 52 for a pilot and to assist that pilot in IMC. An aircraft information collation unit 54 connects to aircraft navigation unit 56 and aircraft attitude and air data unit 58 so as to collate relevant information that may be used to generate display 52. Those skilled in the art should appreciate that units 56, 58 may represent one or more existing aircraft electronic devices or instruments that provide navigation, attitude and air data information; collation unit 54 connects with units 56, 58 through one or more data buses 60.

In illustrative operation, navigation unit 56 delivers the following data to collation unit 54 over buses 60: the direction to next waypoint over data bus 60A; the information about last waypoint over data bus 60B; and a left/right deviation over data bus 60C. Similarly, in illustrative operation, attitude and air data unit 58 delivers the following data to collation unit 54 over buses 60: distance and bearing information over data bus 60D; speed and altitude information over data bus 60E; and latitude/longitude information over data bus 60E.

Information collation unit 54 connects to, and communicates with, image processing unit 60 via data bus 62. Image processing unit 60 includes a graphics engine 64, software depiction interface 66, navigation engine 68, and image drive processor 70. Image processing unit 60 serves to process information collated at aircraft information collation unit 54 to generate display 52. Accordingly, navigation engine 68 processes navigation and/or attitude data to provide a format suitable for graphical use in display 52. Software depiction interface 66 provides for user adjustments and inputs to data within display 52, so that the pilot may select desired detail within display 52; a pilot may for example select desired waypoint symbols and/or add or delete displayed symbology by inputs to bus 67 so as to direct the aircraft. Graphics engine 64 provides the primary image processing capability of processing unit 60, converting data to graphic form in a manner consistent with perspective viewing and user selections. Image driver processor 70 transmits graphics information to flight monitor 72, along bus 74, to drive display 52 as shown.

Those skilled in the art should appreciate that the architecture design of system 50 is a matter of design choice and that alternative configurations may exist without departing from the scope of the invention. By way of example, navigation unit 56 and/or attitude and air data unit 58 may provide additional, different or less information to collation unit 54 as compared to the data illustratively shown on data buses 60. In another example, image processing unit 60 may be integral with aircraft information collation unit 54; it may also be constructed by software modules to drive display 52 as an alternative to one or more of units 64, 66, 68 and 70.

Figure 1:
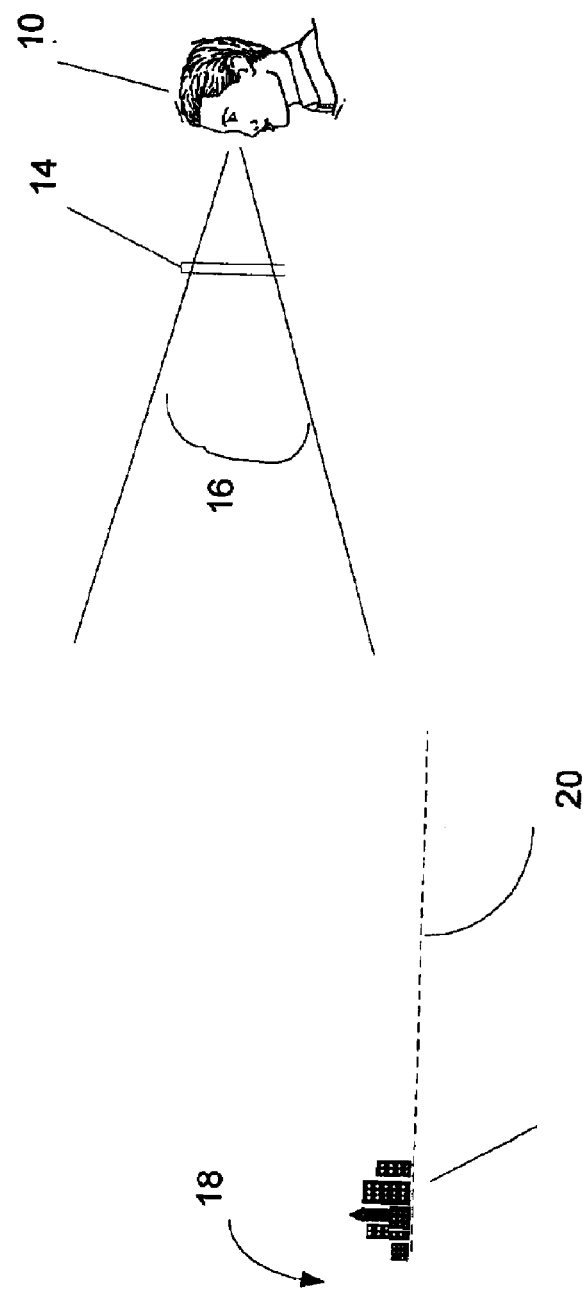
FIG. 1 is a cross-sectional side view of a pilot viewing landmarks and earth ground through a cockpit window.
Figure 2:
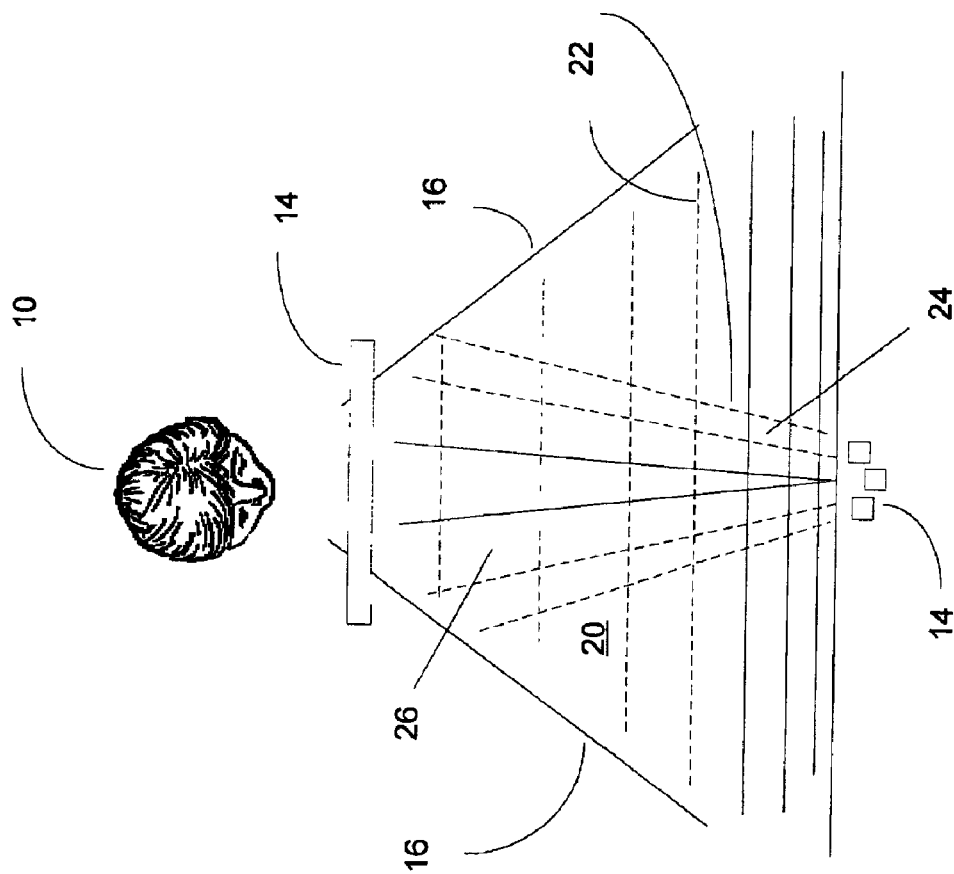
FIG. 2 is a top view of the pilot, landmarks and ground of FIG. 1.
Figure 3:
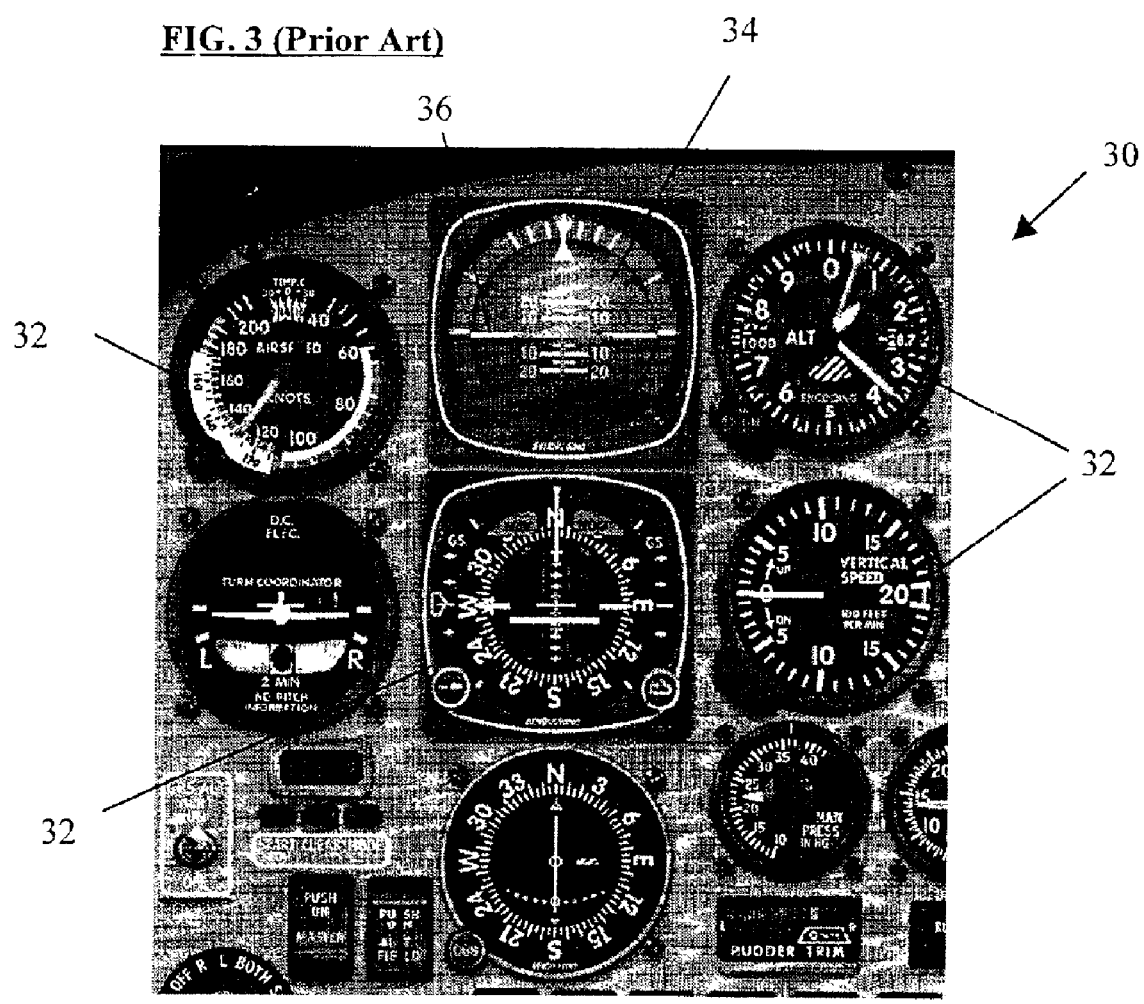
FIG. 3 illustrates prior art attitude devices and navigation display.
Figure 5:
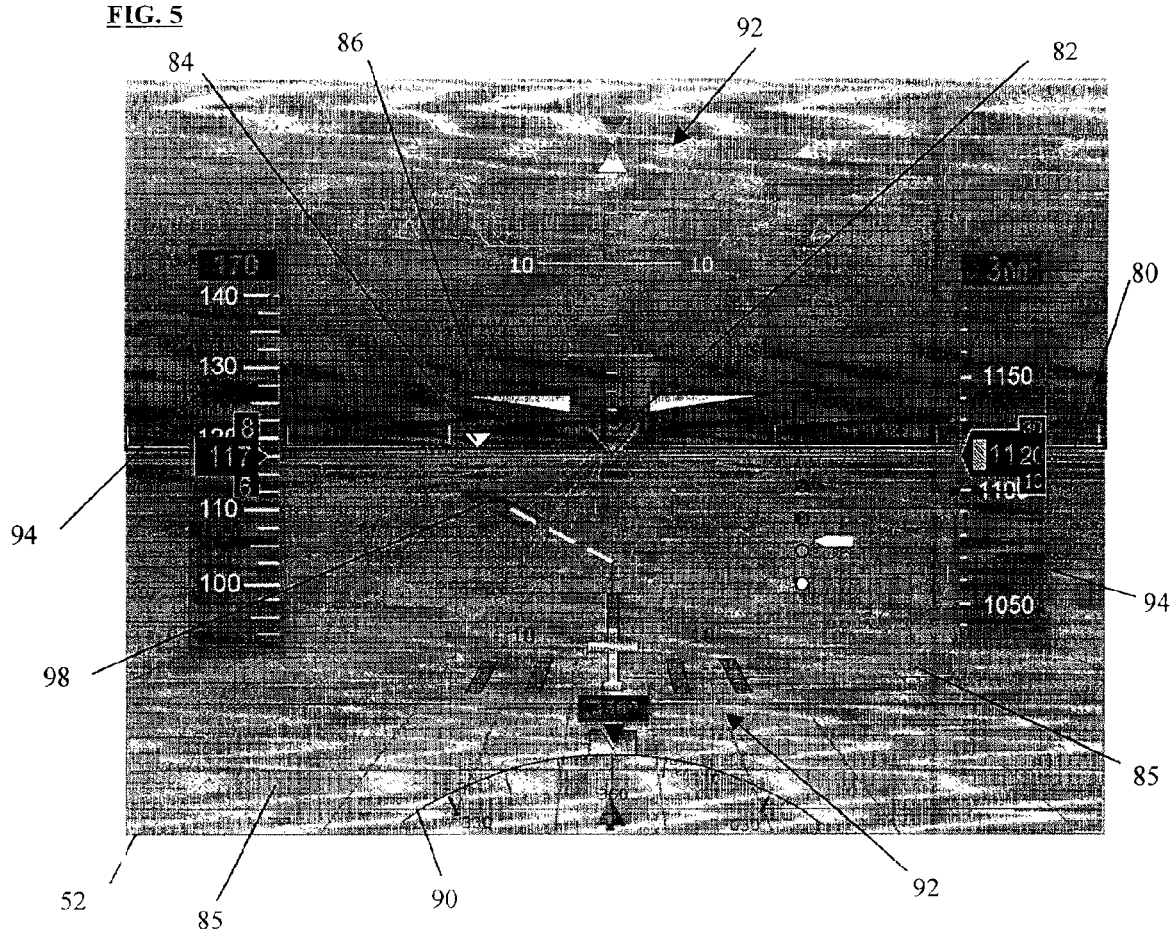
FIG. 5 shows one representative display of the invention illustrating a current waypoint and a next waypoint integrated with a display horizon relative to a ground pattern conforming to a pilot's visual perspective within the aircraft.

Display 52 is shown in more detail in FIG. 5. In the preferred embodiment of the invention, much of the symbology of display 52 is conformal and located on or near the display's simulated horizon line 80; during IMC, therefore, the pilot would fly to a symbol in a manner that is similar to VFR flight. By way of example, a symbol 82 indicates the current track heading; a symbol 84 indicates the next waypoint heading. Earth's ground is preferably displayed as arrays of contiguous squares 85 providing perspective of ground distance, similar to ground 20 and grid lines 22, FIG. 2, and substantially conformal with what the pilot would see with VMC. In one preferred embodiment, the pilot controls location of symbol 82 on display 52 (e.g., through interface with software depiction interface 66 and bus 67, FIG. 4); the aircraft then navigates to waypoint 82. In another embodiment, symbol 82 indicates the correct heading bearing, and the pilot selects a different heading (e.g., through navigation instruments) to keep symbol 82 in the same relative position on display 52, similar to VMC flight; the aircraft then navigates to waypoint 82. In no-wind conditions, operation of the track bearing and heading bearing for the current waypoint are preferably identical.

In other embodiments, display 52 is varied to account for horizon displays that are track adjusted or are represented in True North, such as for over-flights of the North Pole. Display 52 preferably includes other symbology, such as compass heading symbols 90, pitch heading deviation symbols 92 and attitude indicators 94, as shown. To enhance situation awareness, landmarks such as an airstrip 98 are preferably depicted on ground 85 in a perspective and conformal view.

Figure 6:
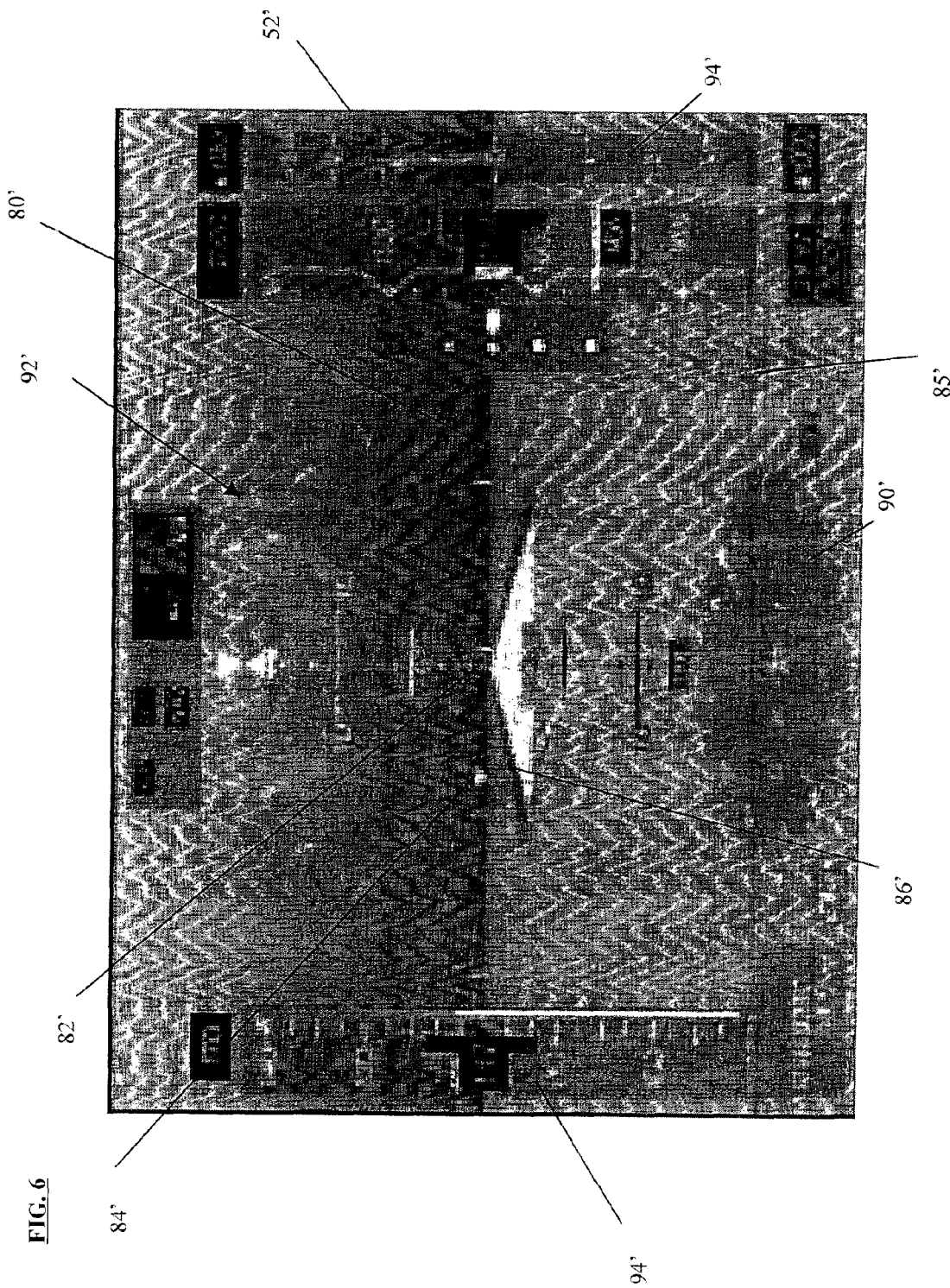
FIG. 6 shows an alternative display of the invention illustrating a current waypoint and a next waypoint integrated with a display horizon relative to a ground pattern conforming to a pilot's visual perspective within the aircraft.

FIG. 6 shows an alternative display 52', with like items having like numbering as in FIG. 5.

The invention thus attains the objects set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

What is claimed is:

1. A method for enhancing TMC flight aboard an aircraft, comprising the steps of: collecting navigation, airspeed, altitude, direction of flight, and attitude data from the aircraft; generating a flight display, the primary flight display being located on an instrument panel and configured to simultaneously indicate the altitude, attitude, and direction of flight, and as a function of the data to show a perspective view of earth ground and horizon that are substantially conformal with a VMC view from the aircraft; and generating at least one of a current or next waypoint symbol on the display at the horizon.

2. A method of claim 1, wherein the step of generating at least one of a current or next waypoint comprises the step of generating a first symbol at the horizon to indicate the current waypoint.

3. A method of claim 2, wherein the step of generating at least one of a current or next waypoint comprises the step of generating a second symbol at the horizon to indicate the next current waypoint.

4. A method of claim 1, further comprising the step of selecting a desired current waypoint; wherein the steps of generating comprise altering the perspective view to match the selected waypoint.

5. A method of claim 4, wherein the step of selecting comprises electronically moving the symbol on the display.

6. A method of claim 4, wherein the step of selecting comprises adjusting navigation settings aboard the aircraft to alter the data.

7. A method of claim 1, further comprising generating one or more situation awareness symbols on the display.

8. A method of claim 7, wherein the step of generating one or more situation awareness symbols comprises generating one or more of the following: an attitude symbol reflecting aircraft speed; an attitude symbol reflecting aircraft altitude; an attitude symbol reflecting aircraft pitch; and a compass symbol reflecting heading.

9. A method of claim 7, wherein the step of generating one or more situation awareness symbols comprises generating one or more landmarks.

10. A method of claim 9, wherein the step of generating one or more landmarks comprises generating an airstrip conformal with the earth ground perspective view.

11. A method of claim 1, wherein the step of collecting navigation and attitude data from the aircraft comprises acquiring aircraft speed and altitude from air and attitude instruments of the aircraft.

12. A method of claim 1, wherein the step of collecting at least one of navigation and attitude data from the aircraft comprises acquiring one or more of the following from navigation instruments of the aircraft: direction to next waypoint, last waypoint information, and left/right deviation.

13. A display system for IMC, comprising: an information collation unit for acquiring data from navigation, airspeed, altitude, direction of flight, and attitude instruments of an aircraft; and an image processing unit for (a) generating a primary flight display, the primary flight display being located on an instrument panel and configured to simultaneously indicate the altitude, attitude, and direction of flight, and as a function of the data to show a perspective view of earth ground and horizon that are substantially conformal with a VMC view from the aircraft and (b) generating at least one of a current or next waypoint symbol on the display at the horizon.

14. A display system of claim 13, the information collation unit acquiring aircraft speed and altitude from the air and attitude instruments of the aircraft.

15. A display system of claim 13, the information collation unit acquiring information including direction to next waypoint and last waypoint direction from the navigation instruments of the aircraft.

16. A display system of claim 13, further comprising a monitor for showing the display within the aircraft.

17. A display system of claim 13, the image processing unit generating the current waypoint collocated with the horizon.

18. A display system of claim 13, the image processing unit generating the next waypoint collocated with the horizon.

19. In an IMC navigation system within an aircraft, the improvement comprising an image processing unit for (a) collating navigation, airspeed, altitude, direction of flight, and attitude data from the system, (b) generating a primary flight display, the primary flight display being located on an instrument panel and configured to simultaneously indicate the altitude, attitude, and direction of flight, and as a function of the data to show a perspective view of earth ground and horizon that are substantially conformal with a VMC view from the aircraft, and (c) generating at least one of a current or next waypoint symbol on the display at the horizon.

20. In an IMC navigation system of claim 19, the further improvement wherein the image processing unit responds to one of user inputs or navigation controls to alter the symbol and view on the display.

* * * * *